United States Patent
MacLeod et al.

(10) Patent No.: US 7,190,747 B2
(45) Date of Patent: Mar. 13, 2007

(54) FREQUENCY MISMATCH COMPENSATION FOR MULTIUSER DETECTION

(75) Inventors: Robert B MacLeod, Nashua, NH (US); Joshua D Niedzwiecki, Manchester, NH (US); Kari M Karwedsky, Merrimack, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 767 days.

(21) Appl. No.: 10/423,695

(22) Filed: Apr. 25, 2003

(65) Prior Publication Data

US 2003/0187928 A1 Oct. 2, 2003

Related U.S. Application Data

(63) Continuation-in-part of application No. 10/105,918, filed on Mar. 25, 2002.

(51) Int. Cl.
H04L 27/06 (2006.01)
(52) U.S. Cl. .................................. 375/344
(58) Field of Classification Search ............... 375/326, 375/344
See application file for complete search history.

(56) References Cited

U.S. PATENT DOCUMENTS

| | | | |
|---|---|---|---|
| 5,790,606 A | 8/1998 | Dent | |
| 5,982,813 A | 11/1999 | Dutta et al. | |
| 6,122,269 A | 9/2000 | Wales | |
| 6,198,775 B1 | 3/2001 | Khayrallah et al. | |
| 6,219,341 B1 | 4/2001 | Varanasi | |
| 6,847,693 B1 * | 1/2005 | Strait | 375/355 |
| 2002/0037061 A1 | 3/2002 | Learned | |
| 2002/0037737 A1 | 3/2002 | Learned et al. | |
| 2002/0067779 A1 | 6/2002 | Jaffe et al. | |
| 2002/0168032 A1 | 11/2002 | Legrand et al. | |
| 2004/0041638 A1 * | 3/2004 | Vilcocq et al. | 331/16 |

FOREIGN PATENT DOCUMENTS

| | | |
|---|---|---|
| EP | 1 063 826 A1 | 12/2000 |
| JP | 2000252958 A | 9/2000 |
| WO | WO 02/069493 A2 | 9/2002 |
| WO | WO 03/028205 A1 | 4/2003 |

OTHER PUBLICATIONS

European Search Report dated Feb. 24, 2006 of European Application No. EP 04 00 9474 filed Apr. 22, 2004.
Langlais C et al: "Synchronisation in the carrier recovery of a satellite link using Turbo-Codes with the help of tentative decisions", IEE Colloquim: Turbo Codes In Digital Broadcasting -Could It Be Double Capacity, Nov. 22, 1999, pp. 5/1-5/7, XP-002178507, abstract; figure 2, sections 1-3.
Oh W, Cheun K: "Joint Decoding and Carrier Phase Recovery Algorithm for Turbo Codes" IEEE Communications Letters, IEEE Service Center, Piscataway, NJ, US, vol. 5, No. 9, Sep. 2001, pp. 375-377, XP-001107973, ISSN: 1089-7798, abstract; figure 1, Sections I and II.

(Continued)

*Primary Examiner*—Kevin Kim
(74) *Attorney, Agent, or Firm*—Maine & Asmus (57) ABSTRACT

Techniques for compensating for frequency mismatch between transmitters and receivers of a multiuser communication system having a plurality of users are disclosed. In particular, the mismatch of carrier frequency estimates are estimated and compensated for each user of the system. This is accomplished without increasing the training overhead of the system. Symbol phase drift and offset is computed by estimating phase error profile parameters (e.g., slope and offset). The disclosed techniques may be used to correct for symbol rotation in any one decision region, or in neighboring decision regions.

33 Claims, 9 Drawing Sheets

OTHER PUBLICATIONS

Wang, Xiaodong, Interative (Turbo) Soft Interference Cancellation and Decoding for Coded CDMA, IEEE Transactions on Communications, Jul. 1999, pp. 1046-1061, vol. 47, No. 7.

Fu, Hongyi, Blind Channel and Carrier Offset Estimation in Multiuser CDMA, IEEE, 2002, pp. 21-25.

Alexander, Paul, D., Interative Multiuser Interference Reduction: Turbo CDMA, IEEE Transactions on Communications, Jul. 1999, pp. 1008-1014, vol. 47, No. 7.

* cited by examiner

FREQUENCY MISMATCH COMPENSATION FOR MULTIUSER DETECTION

RELATED APPLICATIONS

This application is a continuation-in-part of U.S. application Ser. No. 10/105,918, filed Mar. 25, 2002. In addition, this application is related to U.S. Pat. No. 6,947,502. This application is also related to U.S. Pat. No. 7,092,452. Each of these applications is herein incorporated in its entirety by reference.

FIELD OF THE INVENTION

The invention relates to multiuser detection systems, and more particularly, to carrier frequency mismatch compensation techniques for multiuser detection receiver applications.

BACKGROUND OF THE INVENTION

Receivers for digital communications systems are becoming available which can handle several transmissions simultaneously. Such receivers typically make use of multiuser detection, commonly referred to as MUD. Multiuser Detection is a means by which several signals either completely or partially occupying a single communications channel can be separated mathematically.

To operate, a MUD receiver must have the received data available, and must have knowledge of the basic waveform transmitted at each transmitter, as appearing in the receiver. This basic waveform is commonly referred to as a composite signature waveform. Each transmission's composite signature waveform is the waveform that would be present in the receiver, if only one data symbol had been transmitted by each transmitter individually. These waveforms each define a column in an 'S' matrix in the MUD receiver, sometimes called the signature matrix. To compute these waveforms, and the signature matrix, some means of parameter estimation is necessary.

The parameter estimates for a MUD receiver can be calculated once for every frame of data being transmitted, and the quality of these estimates varies over the length of the associated frame. This situation becomes especially problematic as the frame length is increased. In particular, mismatches between the transmitter and receiver carrier frequencies, which is common in all communications systems, cause the received signals to drift in phase rotation as the frame progresses. This mismatch is most typically due to accuracy limitations of the local oscillators in both the transmitters and receivers, and can also be caused by Doppler shifts due to moving transmitters and/or receivers. If the frequency mismatch is not accurately corrected for, each user's symbol sequence estimates at the output of the MUD module will exhibit a unique constant phase drift and offset. Thus, frequency compensation is necessary.

In a single user communication system, the estimation of the carrier frequency difference between the transmitter and the receiver is performed before the symbol estimates are made. This carrier mismatch is usually estimated and compensated for using a phased lock loop at the front end of the receiver. This same technique is not possible in a multiuser detection system because the received signal is composed of the superposition of each transmission signal as seen at the receiver, and the frequency mismatch is unique between the receiver and each transmitter. Therefore, a technique is needed to estimate and correct for the effects of the frequency mismatch that is unique between the receiver and each transmitter.

In a typical MUD communication system, bursts of training data are repeatedly sent during a transmission, and parameter estimates are made at the receiver based on these training bursts. Making more frequent parameter estimates at the receiver could help compensate for carrier mismatch. This could be accomplished by decreasing the frame length, or making more frequent bursts of training data. This compensation technique for handling carrier mismatch drift, however, is associated with a number of disadvantages.

One of the more significant disadvantages is that the overhead of the system is increased. This means that for a fixed signaling rate of the system, training data will replace the payload data, thereby decreasing throughput of payload data or decreasing the overall information carrying capacity of the channel. If more sophisticated estimators are attempted, the frequency of training-estimate passes may be held more or less constant, but these methods typically imply more training support (e.g., bigger training packets). This increase in training support has a similar effect in that payload data is being displaced by training data and overall capacity is decreased.

What is needed, therefore, are techniques for performing frequency mismatch compensation for multiuser detection applications.

BRIEF SUMMARY OF THE INVENTION

Using the techniques described herein, carrier frequency mismatch can be estimated and compensated for without increasing the training overhead of the system. Furthermore, carrier frequency mismatch estimation is generalized to the multiuser case in which there is a different carrier frequency mismatch between a particular receiver and each transmitter in the system.

One embodiment of the present invention provides a method of compensating for frequency mismatch between a receiver and each transmitter of a multiuser communication system having a plurality of users. The method includes calculating a phase error profile for a user, where the phase error profile has one or more sloping sections. The method further includes calculating estimates of symbol drifts and offsets associated with each sloping section, and compensating for frequency mismatch associated with the user based on the estimates of symbol drifts and offsets. This method may be performed for each of the plurality of users.

In one such embodiment, demodulated symbols associated with a received user signal are output by a linear MUD module of the system, and compensating for frequency mismatch associated with the user includes multiplying each symbol of the demodulated symbols by a complex phasor having opposite direction of the estimates of symbol drifts and offsets. The method may further include computing estimated symbol drift and offset aggregate results from the estimates of the symbol drifts and offsets, where the compensating for frequency mismatch associated with the user is based on the estimated symbol drift and offset aggregate results. A number of samples may be used in computing estimates, and computing the estimated symbol drift and offset aggregate results may include averaging the drift and offset estimates associated with each sloping section, where each estimate is weighted by the number of samples of data used in calculating that estimate. Calculating estimates of the symbol drift and offset associated with each sloping section include, for example, independently calculating a linear least squares fit to data of each sloping section.

Another embodiment of the present invention provides a method of compensating for frequency mismatch between a receiver and each transmitter of a multiuser communication system having a plurality of users. The method includes calculating a phase error profile for a user, where the phase error profile has at least one sloping section and at least one transition region associated with symbol drift and offset. The method further includes calculating an estimate of the location of each transition region in the phase error profile, identifying transition region data that is above a predetermined threshold, and eliminating the identified transition region data above the predetermined threshold from subsequent processing. The method continues with calculating estimates of the symbol drifts and offsets associated with each sloping section, computing estimated symbol drift and offset aggregate results from the estimates of the symbol drifts and offsets, and compensating for frequency mismatch associated with the user based on the estimated symbol drift and offset aggregate results. The method may be performed for each of the plurality of users.

In one such embodiment, demodulated symbols associated with a received user signal are output by a linear MUD module of the system, and compensating for frequency mismatch associated with the user includes multiplying each symbol of the demodulated symbols by a complex phasor having opposite direction of the estimated symbol drift and offset aggregate results. Note that a static phase offset associated with each sloping section can be accounted for in symbol offset estimates. Calculating an estimate of the location of each transition region in the phase error profile includes, for example, calculating a derivative of the phase error profile, and calculating an absolute value of the phase error derivative.

Another embodiment of the present invention provides a system for compensating for frequency mismatch between a receiver and each transmitter of a multiuser communication system having a plurality of users. The system includes a symbol drift and offset estimation module adapted to calculate estimates of symbol drift and offset associated with one or more sloping sections included in a user's phase error profile, and a frequency adjustment module adapted to compensate for frequency mismatch based on the estimates of symbol drift and offset.

In one such embodiment, the system further includes a phase error profile module adapted to calculate a phase error profile for the user, and an aggregate results computation module adapted to compute estimated symbol drift and offset aggregate results based on the estimates of symbol drift and offset associated with the user. The frequency adjustment module compensates for frequency mismatch based on the estimated symbol drift and offset aggregate results. The frequency adjustment module may be further adapted to multiply each symbol of a stream of demodulated symbols (e.g., from a MUD module) by a complex phasor having opposite direction of the estimated symbol drift and offset aggregate results.

A number of samples can be used in computing estimates, and the aggregate results computation module may be further adapted to average the drift and offset estimates associated with each sloping section, where each estimate is weighted by the number of samples of data used in calculating that estimate. In one particular embodiment, the frequency adjustment module is configured with an output that is fed back to an input of the phase error profile module, thereby enabling an iterative symbol drift and offset estimation process for the user. Here, the aggregate results computation module is further adapted to calculate the estimated symbol drift and offset aggregate results for the user by summing drift and offset estimates computed each iteration.

The system may further include a transition region location estimation module adapted to calculate an estimate of the location of each transition region (if any) in the phase error profile, and a transition region data selector module adapted to identify transition region data that is above a predetermined threshold. The transition region data selector module can be adapted to eliminate the identified transition region data from subsequent processing. Alternatively, the transition region data selector module can be adapted to assign the identified transition region data to its corresponding slope section, so that it will be included in symbol drift and offset estimations. The frequency adjustment module may be adapted, for example, to multiply each symbol of a stream of demodulated symbols by a complex phasor having opposite direction of the estimates of symbol drift and offset.

Another embodiment of the present invention provides a system for compensating for frequency mismatch between a receiver and each transmitter of a multiuser communication system having a plurality of users. The system includes a bank of frequency compensation modules, where each frequency compensation module is adapted to provide a vector of frequency compensated symbols for a particular user, and to calculate estimated symbol drifts and offsets for that user. The system further includes a bank of decoder modules, where each decoder module is adapted to receive a vector of frequency compensated symbols from a corresponding one of the frequency compensation modules, and to provide error correction, and a linear multiuser detection module adapted to receive the estimated symbol drifts and offsets for each user from the bank of frequency compensation modules, and frequency compensated bit estimates from the bank of decoder modules.

The modules are operatively coupled together to facilitate iterative processing, known as Turbo MUD. The linear multiuser detection module could therefore use the information received from the frequency compensation and decoder modules to generate better estimates of the symbols for each user. These improved symbol estimates could again be passed to the bank of frequency compensation modules to repeat the process. This process can be iterated multiple times until, for example, a predetermined number of iterations is reached or until the difference between the symbol estimates of the current and previous iteration are below a predefined threshold.

In one such embodiment, each frequency compensation module is further adapted to calculate a phase error profile for a corresponding user, where the phase error profile has at least one sloping section and at least one transition region associated with symbol drift and offset. Each frequency compensation module may be further adapted to calculate an estimate of the location of each transition region in the phase error profile. Each frequency compensation module, for example, calculates estimates of symbol drifts and offsets associated with each sloping section by independently calculating a linear least squares fit to data of each sloping section.

Each frequency compensation module may be further adapted to identify transition region data that is above a predetermined threshold, and to ignore that transition region data during subsequent processing. Alternatively, each frequency compensation module may be further adapted to identify transition region data that is above a predetermined threshold, and to calculate the estimated symbol drifts and offsets based on both transition region data having estimates above the predetermined threshold and non-transition region data having estimates below the predetermined threshold. In such a configuration, each frequency compensation module may be further adapted to assign the identified transition region data to a corresponding sloping section, so that it will be included in the symbol drift and offset estimations.

Each frequency compensation module may be further adapted to compute estimated symbol drift and offset aggregate results for a user from the corresponding estimated symbol drifts and offsets. The estimated symbol drift and offset aggregate results are computed, for example, by averaging the drift and offset estimates associated with each sloping section, where each estimate is weighted by the number of samples of data used in calculating that estimate. Each frequency compensation module may be further adapted to multiply each symbol of the demodulated symbols by a complex phasor having opposite direction of the estimated symbol drift and offset aggregate results. In one particular embodiment, the linear multiuser detection module is configured with an MMSE MUD with prior information algorithm. Each decoder module provides error correction, for example, by converting symbols to bits, comparing present bits to at least one of prior bits and subsequent bits, and then converting the bits back to symbols.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Embodiments of the present invention can be employed to solve the problem of poor performance of a MUD receiver when the parameter estimation module computing the S matrix has incorrectly estimated, or more commonly, has not attempted to estimate the carrier frequency difference between the receiver and each transmitter. The carrier frequency difference between the receiver and each transmitter is an important parameter influencing the shape of each waveform contributing to the S matrix. These estimates can be adjusted while the MUD receiver is working, to compensate for faulty estimates or a lack of individual estimates by the parameter estimation module. Note that if carrier frequency estimates are incorporated into the S matrix, then the S matrix will vary for each symbol estimate n. Therefore, the new S matrix will be a function of the current set of symbols being estimated (e.g., S(n)).

In accordance with the principles of the invention, estimates of the carrier frequency mismatch between the receiver and each transmitter are computed based on the sequence of raw symbol estimates at the output of the multiuser detector. These carrier frequency mismatch estimates are additional parameters that are needed for the multiuser detector to make more accurate symbol estimates. Thus, a post-MUD parameter estimator is provided that accomplishes the carrier frequency mismatch estimation and compensation. In addition, parameter estimation can be conducted in a turbo loop. This is related to a class of iterative parameter estimators such as the least-mean-square (LMS), or gradient descent algorithms. The approach here provides parameter estimates to be made in the same iterative (turbo) multiuser detection process. Thus, joint turbo MUD and turbo parameter estimation are enabled.

Multiuser Communication System

Figure 1A:
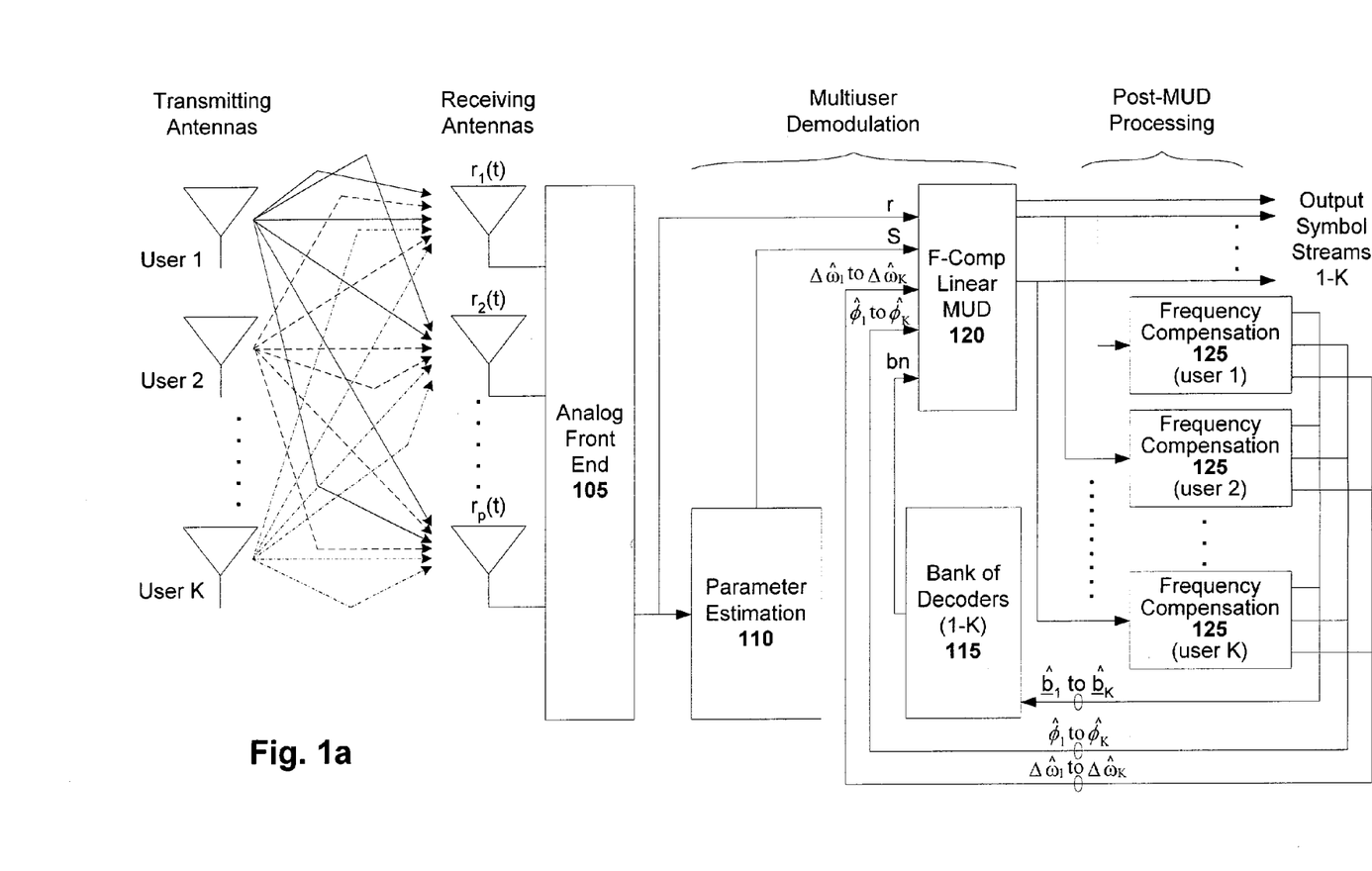
FIGS. 1a and 1b each illustrate a multiuser wireless communication system that includes a number (K) of transmitting antennas and a MUD receiver configured in accordance with an embodiment of the present invention.

FIG. 1a illustrates a multiuser wireless communication system that includes a number (K) of transmitting antennas and a MUD receiver configured in accordance with one embodiment of the present invention. The MUD receiver includes a number (p) of receiving antennas, an analog front end 105, a parameter estimation module 110, a bank of K decoders 115, a multiuser detection module 120, and a bank of K frequency compensation modules 125.

As can be seen, each user k is associated with a loop including the MUD module 120, a corresponding frequency compensation module 125, and a corresponding decoder module 115. These modules are configured to pass corresponding user data amongst themselves in an iterative fashion, known as Turbo MUD. This means that at each time instant, a group of bit decisions is adjusted by each of the modules several times before final bit decisions are issued by the system.

In a multiuser communication system the users (1–K) generally transmit signals on the same channel (i.e., at the same time and frequency). However, in practicality, due to the physical limitations of most communication systems, there are small carrier frequency differences between each transmitter. Likewise, there are small carrier frequency differences between each transmitter and the receiver. The various transmitted signals are received at antennas (1–p). In one embodiment, the p receive antennas for a single receiver are at least one of space and polarization diverse. The received signal of any one antenna includes the superposition of the directly received signals, as well as multipath signals, from all received transmissions.

The plurality of signals from each receiver antenna are processed by the analog front end 105. For example, the analog front end 105 downconverts higher frequency signals into baseband signals or other relatively lower frequency signals prior to processing. The received signals are also digitized by analog to digital converters (A/D). Filtering, amplification, and other conventional processing, may also be implemented in the analog front end 105.

The parameter estimation module 110 estimates the relative received timing offsets, phases, received amplitudes, and multipath structure for each of the interfering signals present in the received signal. The result of such parameter estimation is a matrix (S) of estimated composite signature waveforms for each user, which is used by the MUD 120 to help separate the channel signals.

The bank of frequency compensation modules 125 receives a sequence of raw symbol estimates for each user at the output of the MUD 120, and provides drift and offset estimates for each of the K users ($\Delta\hat{\omega}_1$ to $\Delta\hat{\omega}_K$ and $\hat{\phi}_1$ to $\hat{\phi}_K$), and a vector of frequency compensated symbols for each of the K users ($\underline{\hat{b}}_1$ to $\underline{\hat{b}}_K$).

The bank of decoders 115 (e.g., BCJR decoders) includes decoders 1–K, each one communicatively coupled to a corresponding frequency compensation module 125. The bank of decoders 115 receives vectors of frequency compensated symbols for each of the K users ($\underline{\hat{b}}_1$ to $\underline{\hat{b}}_K$) output by the corresponding frequency compensation modules 125, and provides error correction for each user by converting symbols to bits, comparing present bits to prior bits and/or subsequent bits, and then converting the bits back to symbols. Any number of various decoding algorithms can be employed here, such as Soft Viterbi or BCJR decoding. The result of such an error correction is a matrix (b(n)) of symbol estimates which are used by MUD 120 in the iterative process to provide better estimates of the particular symbols. Note that the b(n) matrix includes the frequency compensated symbol estimates for each of the K users.

The MUD module 120 includes functional blocks that process the digital data and extract the user signals. There is typically a pre-processor that converts the baseband digital data into the proper format for further processing according to the desired detection scheme. The format is typically one measurement per 'dimension' per symbol, but other formats may be used as well.

Note that MUD module 120 is configured for linear operation. In one embodiment, module 120 is configured with an MMSE MUD with prior information algorithm. Further note that MUD module 120 is adapted for frequency compensation, in that it receives drift and offset information ($\Delta\hat{\omega}_1$ to $\Delta\hat{\omega}_K$ and $\hat{\phi}_1$ to $\hat{\phi}_K$) for each of the K users. This drift and offset information can be formed into an E(n) matrix of complex phasors, which are a function of the drift, offset estimates for each of the K users by MUD module 120. This E(n) matrix varies as a function of the symbol index n.

Figure 1B:
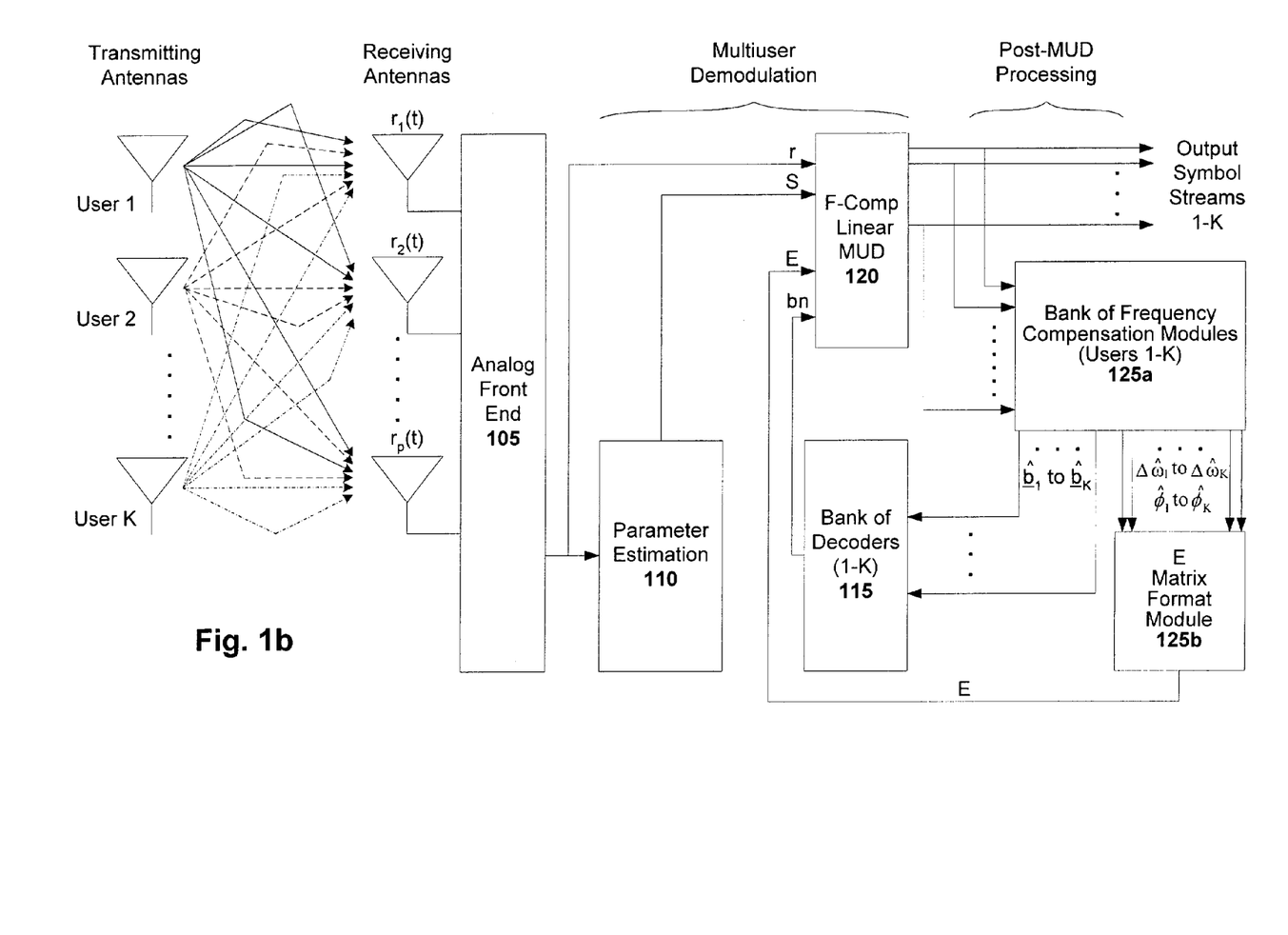

Alternatively, the bank of frequency compensation modules 125 can be configured with an output stage having an E(n) matrix formatter module 125b as shown in FIG. 1b. In this embodiment, an E(n) matrix is provided to the MUD module 120. Other embodiments of the system may include a MUD module 120 that receives an S(n) matrix (from the parameter estimation module 110), where the S(n) matrix incorporates the desired compensation for drift and offset errors. In such an embodiment, the drift and offset information from the frequency compensation modules 125 could be provided to the parameter estimation module 110 instead of the MUD module 120. A matrix formatting module can be configured to receive the drift and offset information and form a corresponding matrix.

Typically, a MUD module used in a turbo MUD setting is functionally related to the data, signature matrix, amplitudes, and prior information on the symbols. A corresponding MUD algorithm can be summarized as:

$$b_{new} = f(S, A, b_{old}, r) \tag{1}$$

where S is an N dimension by K user signature matrix, each column of which is the composite signature waveform for each user, and A is a diagonal matrix of K amplitudes for each. The prior information on the symbols would be reflected in a K by 1 vector of soft symbols, or prior probabilities $b_{old}$, and the section of data corresponding to these bit decisions in the N by 1 vector r. Many solutions to the MUD problem defined by the function 'f' are possible, and can be based on the model:

$$r = SAb + \text{noise}. \tag{2}$$

One such solution would be the optimal MUD solution with prior information about the symbols:

$$b_{new} = \arg\max_{b}\{2 * \text{Re}\{b'AS'r\} - b'S'Sb + 2\sigma^2 \ln\{p_{b(old)}(b)\}\}. \tag{4}$$

Another solution would be the linear least squares solution, Minimum Mean Squared Error (MMSE) written as follows:

$$b_{out} = (\sigma^2 I + AS^H SA)^{-1}(SA)^H r. \tag{5}$$

Here, $\sigma^2$ is the power in the noise process, which can be estimated from the data r. Also, note that in the MMSE MUD, the prior information about the symbols is not accounted for. In a turbo-MUD, the prior information about the symbols is simply the output of the algorithm at the previous iteration. For this reason, a conventional MMSE solution cannot be used as-is in a turbo MUD. Rather, a method of using MMSE MUD with prior information about the symbols should be used. One such method that can be employed by MUD 120 is described in detail in U.S. application Ser. No. 10/105,918, titled "System for Decreasing Processing Time in an Iterative Multi-User Detector System."

It often happens that the model r=SAb+noise is changing (in time) as each symbol for each user is transmitted. Embodiments of the present invention provide a means to compensate for a particular type of change, one in which the complex phase of the transmitted waveform for each user is slowly changing. Consider:

$$r = S(n)Ab = \sum_{k=1}^{K} s_k(n)a_k b_k = \sum_{k=1}^{K} \tilde{s}_k \cdot e_k(n) a_k b_k = \tilde{S}E(n)Ab, \tag{6}$$

where S(n) denotes an S matrix which is changing as a function of the symbol index. In this equation, the portion of S(n) that is changing is separated, and put into the diagonal phasor E(n) matrix, which can be represented as $E(n) = \text{diag}\{e_1(n)\ e_2(n)\ \ldots\ e_K(n)\}$, where $e_k(n) = \lfloor \exp(-j(\Delta\hat{\omega}_k n + \hat{\phi}_k))\ \ldots\ \exp(-j(\Delta\hat{\omega}_k(n+N-1) + \hat{\phi}_k))\rfloor$, and N=the total number of symbols to use when making each symbol estimate. $\tilde{S}$ is that portion of the S matrix which is static as time progresses. Thus, a fifth argument, E(n), is added to the MUD algorithm of equation 1:

$$b_{new} = f(S, A, E(n), b_{old}, r) \quad (7)$$

Since the effect of the E(n) matrix is intimately connected with the S matrix, one specific MUD solution would be the Q-algorithm described in U.S. application Ser. No. 10/105,918, where the linear computation is modified as follows:

$$b(n)_{out} = (\sigma^2 I + A S^H E(n)^H E(n) S A)^{-1} (S E(n) A)^H r \quad (8)$$

In the case of frequency mismatch addressed herein, the E(n) matrix would be:

$$E(n) = diag\{e_1(n) e_2(n) \ldots e_K(n)\} \quad (9),$$

where $e_k(n) = \lfloor \exp(-j(\Delta\hat{\omega}_k n + \hat{\phi}_k)) \ldots \exp(-j(\Delta\hat{\omega}_k(n+N-1) + \hat{\phi}_k)) \rfloor$, and N=the total number of symbols to use when making each symbol estimate, and the product $E(n)^H E(n)$ would simplify to $I_K$ (identity matrix). In this equation, $\Delta\hat{\omega}_K$ is the frequency mismatch in radians per symbol, also referred to as constant phase drift, and $\hat{\phi}_K$ is the phase offset for user k. As previously stated, the E(n) matrix can be computed in the MUD module 120, but may also be computed externally to the MUD module 120.

The frequency compensation modules 125 each receive an output symbol stream associated with one of the K users, and are adapted to correct for symbol phase drift and to provide frequency offset and phase drift estimates for each of the K users. The functionality of the frequency compensation modules 125 is discussed in more detail in reference to FIGS. 3a–e and 4a–b.

Each of the analog front end 105, parameter estimation module 110, and bank of decoders 115 can be implemented in conventional technology. However, variations will be apparent in light of this disclosure. For example, the parameter estimator can be configured as described in U.S. patent application Ser. No. 10/228,787, titled, "Parameter Estimator for a Multiuser Detection Receiver." Also, the parameter estimation module can be further adapted to compute an S matrix which incorporates compensation for phasor errors based on offset and drift estimates provided by the frequency compensation modules 125. Note that in such an embodiment, the phasor inputs Δω and φ of the MUD module 120 would not be necessary. Rather, these inputs could be provided to the parameter estimator module 110.

Communication Model

Figure 1C:
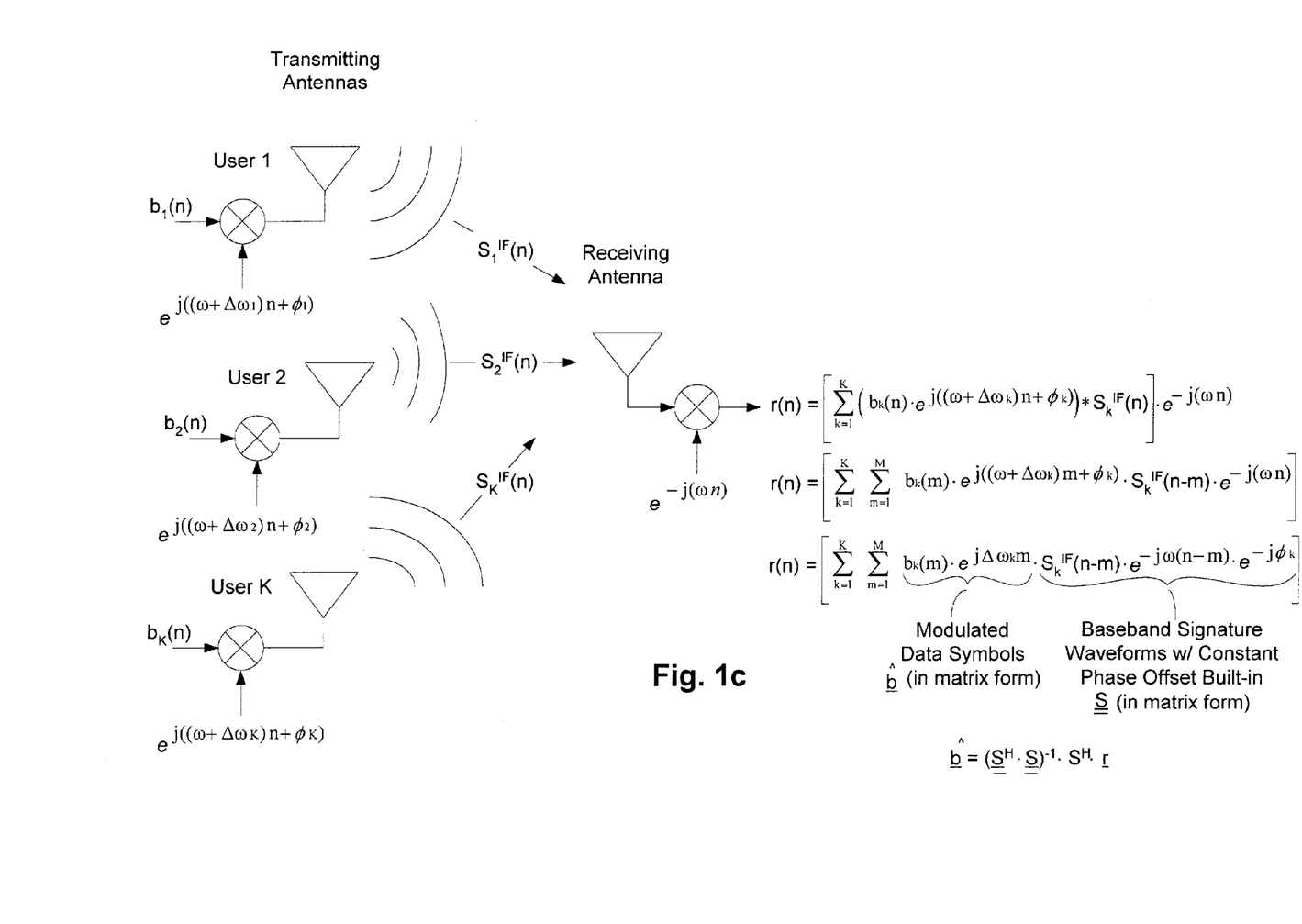
FIG. 1c illustrates a communication model of the systems illustrated by FIGS. 1a and 1b expressing the relationship between each transmitter's transmitted symbol stream and the complex baseband received signal.
Figure 2A:
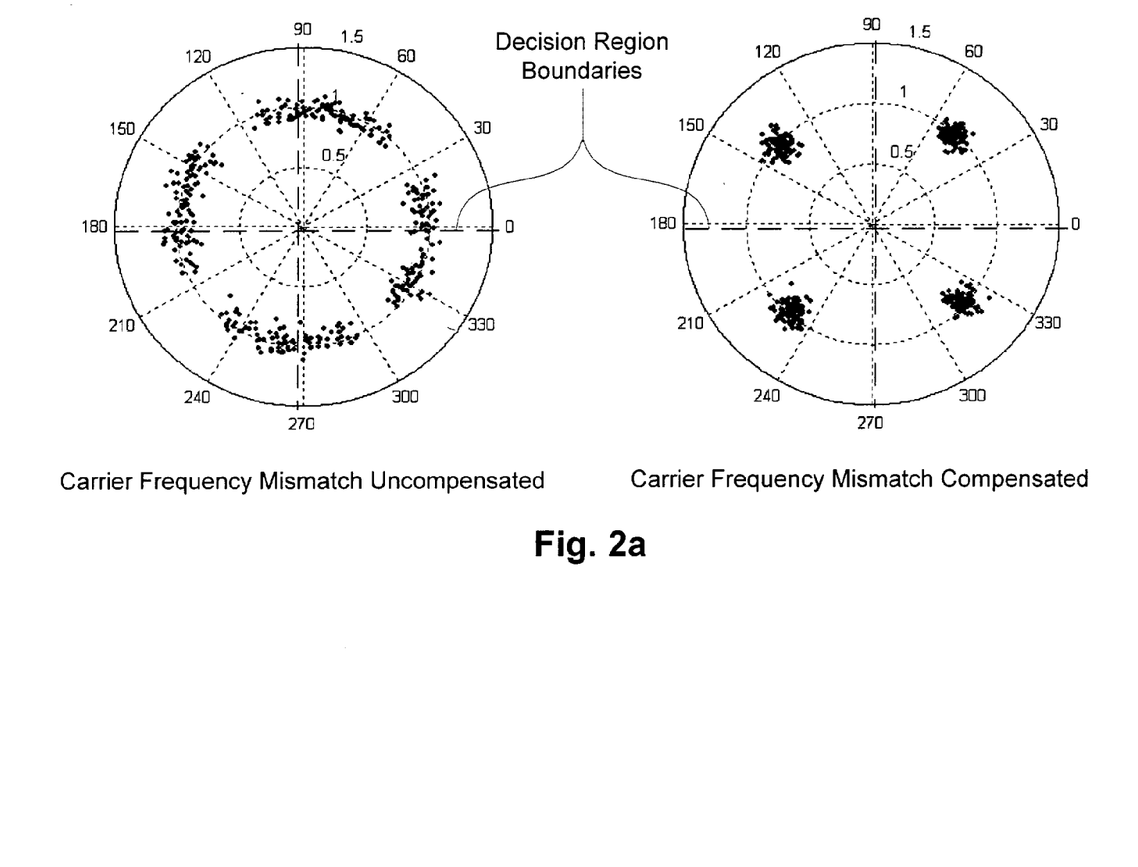
FIG. 2a illustrates QPSK symbol constellation rotation due to carrier frequency mismatch and a corresponding frequency compensated version of the same QPSK symbol constellation.

FIG. 1c illustrates a communication model expressing the relationship between each transmitter's transmitted symbol stream and the complex baseband received signal. Each user is transmitting at a slightly different frequency than other users, as well as the respective receiver. As described in the mathematical model of the received signal, r(n), the difference in frequency between each transmitter and the receiver results in a constant drift of the demodulated symbol estimates for each user. An example of these corrupted symbol estimates for one user is illustrated on the left side of FIG. 2a. As such, it is necessary to accurately correct for this drift in the symbol estimates. The right side of FIG. 2a illustrates a constellation of a communication channel having no carrier frequency mismatch (or compensated carrier frequency mismatch).

Figure 2B:
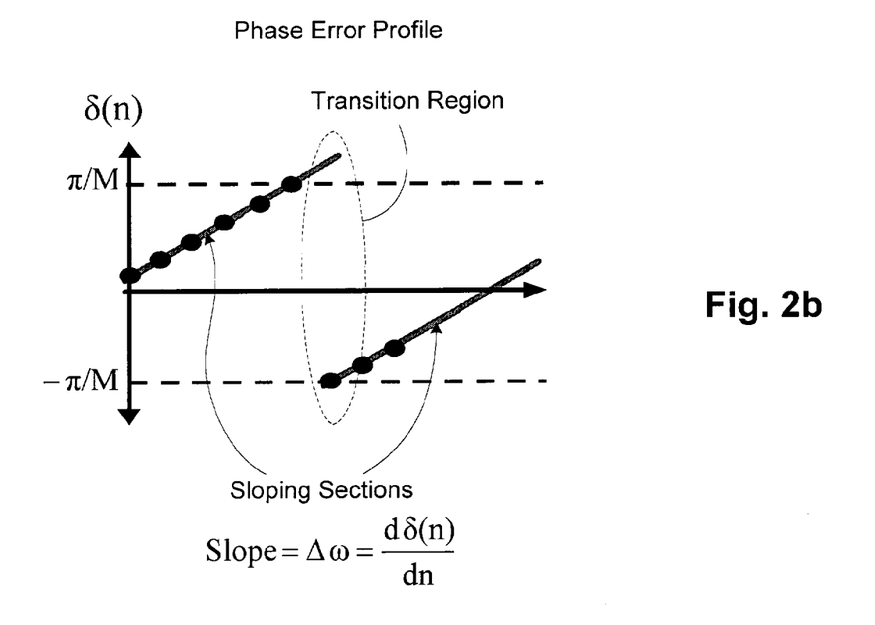
FIG. 2b is a phase error profile demonstrating a transition region when symbol estimates drift into neighboring constellation decision regions thereby making them closer in phase angle to the incorrect constellation point.

Note that if the drift is large enough or the number of symbols is long enough, the symbol estimates begin to drift into neighboring M-PSK constellation decision regions, thereby making them closer in phase angle to the incorrect M-PSK constellation point. This causes a transition region in the phase error profile as shown in FIG. 2b. Here, M represents the number of symbol constellation points (e.g., 4-PSK or QPSK has four symbol constellation points, 8-PSK has eight symbol constellation points). Each transition region causes the phase error profile to shift from π/M to −π/M.

Even though there is a discontinuity by virtue of the transition regions, the slope of the phase error profile remains constant and identical between each transition region. Further note that the slope of each sloping section of the phase error profile is equal to the frequency Δω in radians per symbol of the rotating symbol estimates which is directly related to the carrier frequency mismatch between the receiver and transmitter for a given user. By calculating the slope of the phase error profile, the symbol drift term can be estimated, and thus compensated for.

In accordance with one embodiment of the present invention (and as shown in FIGS. 1a and 1b), the soft demodulated symbol estimates for each user are independently examined at the output of the MUD 120 by corresponding frequency compensation modules 125. In order to estimate the drift applied to each user's demodulated symbol constellation, the phase error between each contiguous symbol estimate b(n) and the closest constellation point is measured based on the constellation alphabet defined for the given communication system. Because the frequency difference between each transmitter and the receiver is constant, the phase error will be linear as a function of the symbol index "n."

Methodology

Figure 3A:
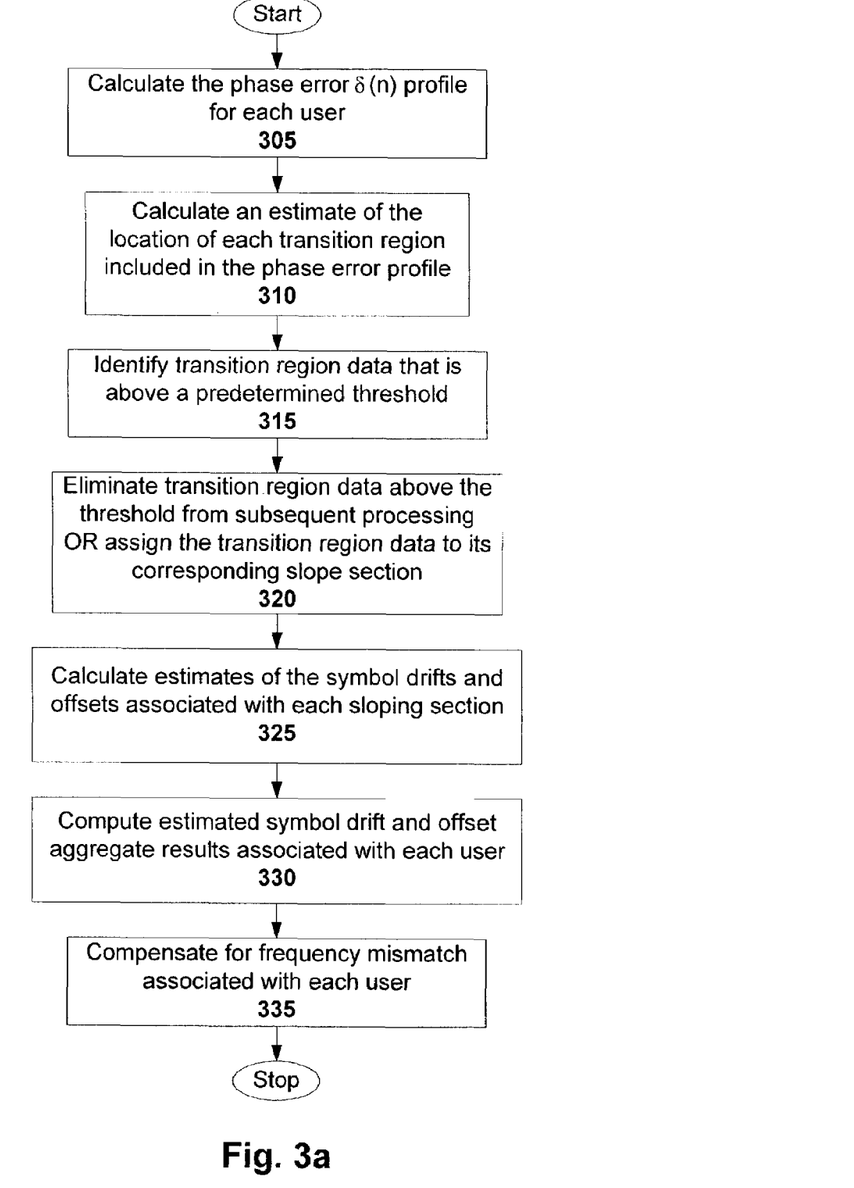
FIG. 3a illustrates a method of compensating for frequency mismatch between transmitting and receiving antennas of a multiuser communication system in accordance with an embodiment of the present invention.

FIG. 3a illustrates a method of compensating for frequency mismatch between a receiver and each transmitter of a multiuser communication system in accordance with one embodiment of the present invention. This method can be carried out, for example, by frequency compensation modules 125 in a multiuser wireless communication system that includes K transmitting users. The outputs provided by the modules 125 can be provided to the corresponding decoder modules and the MUD or parameter estimation modules as discussed herein.

Figure 3B:
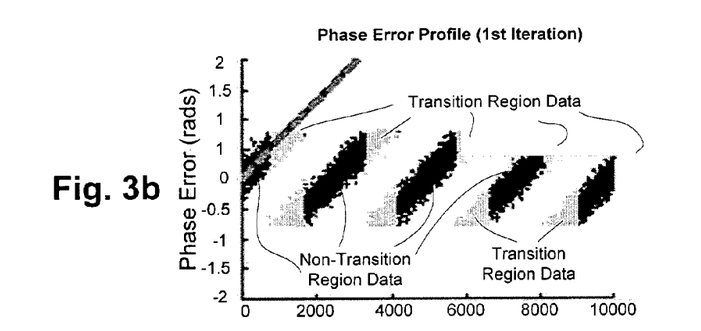
FIGS. 3b–3e illustrate phase error profiles and derivatives for samples data in accordance with an embodiment of the present invention.
Figure 3C:
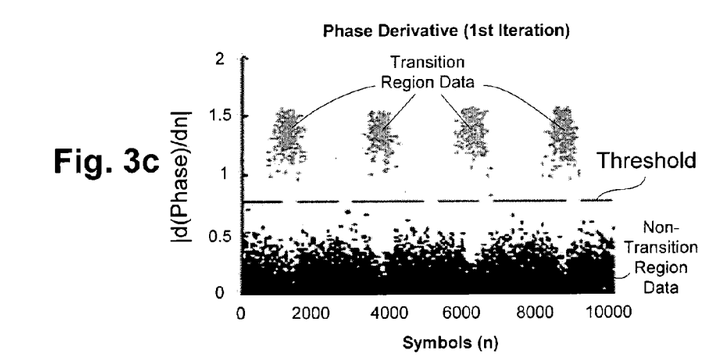

The method begins with calculating 305 the phase error profile for a user, where the phase error profile has one or more sloping sections associated with symbol drift and offset. This phase error profile is estimated using the sequence of raw symbol estimates at the output of the MUD module for each user. A graphical illustration of the phase error profile is shown in FIG. 3b, where the phase error (in radians) is plotted for each of the symbols (n) associated with a corresponding user. As can be seen in this particular example of FIG. 3b, the profile includes a number of sloping sections and transition regions. Each sloping section includes transition region data at its ends, and non-transition region data in between those ends. Transition region data represents the symbol estimates that have drifted over a decision region boundary into a neighboring constellation decision region, thereby making those estimates closer in phase angle to the incorrect constellation point. The non-transition region data, on the other hand, represents the symbol estimates that have drifted within their corresponding constellation decision region, but have not crossed over a decision boundary into a neighboring decision region. Note then, that it is possible that other applications could produce a phase error profile having only one sloping section that is made up of only non-transition region data. In such an application, no decision boundary is crossed during symbol drift.

Once the phase error δ(n) profile is calculated, the method proceeds with calculating 310 an estimate of the location of each transition region in the phase error profile, and identifying 315 transition region data that is above a predetermined threshold. In one embodiment, this is performed by calculating a derivative of the phase error profile, and calculating an absolute value of the phase error derivative (i.e., $|d\delta(n)/dn|$). The transition region data above the set threshold can then be identified. This embodiment is graphically illustrated in FIG. 3c. Note the transition region data is above the threshold, while the non-transition region data is below the threshold. Once the transition region data above the predetermined threshold are identified, the method proceeds with eliminating 320 (or otherwise ignoring) that data from symbol drift ($\Delta\omega$)) and symbol offset ($\Phi$) estimations.

In an alternative embodiment, the transition region data above the threshold can be included in the symbol drift and offset estimations to provide increased accuracy. In such an embodiment, the method would proceed with assigning 320 the transition region data to its corresponding slope section, so that it will be included in the symbol drift and offset estimations, along with the non-transition region data. The assignment of the transition data can be based on the threshold that defines a center point between the ends of each sloping section. This allows the transition data to be qualified as maximum (e.g., above the zero radian phase error as shown in FIG. 3b) or minimum (e.g., below the zero radian phase error as shown in FIG. 3b) possible phase error values.

The method proceeds with calculating 325 estimates of the symbol drift and offset associated with each sloping section. In one embodiment, the symbol drift and offset estimates associated with each sloping section are determined by independently calculating a linear least squares fit to the data of that sloping section. Note that the data of the sloping sections includes the non-transition region data, and may or may not include the transition region data, depending on which step 320 is performed or whether there are any transition regions included in the profile.

Once the symbol drifts and offsets are calculated for each sloping section, the method proceeds with computing 330 aggregate results of the estimated symbol drifts and offsets for the user. Here, the aggregate result of the estimated symbol drifts is designated $\Delta\hat{\omega}_1$ for user 1, $\Delta\hat{\omega}_2$ for user 2, and so on, until $\Delta\hat{\omega}_K$, which is the aggregate result of the estimated symbol drifts for user K. Similarly, the aggregate result of the estimated symbol offsets is designated $\hat{\phi}_1$ for user 1, $\hat{\phi}_2$ for user 2, and so on, until $\hat{\phi}_K$, which is the aggregate result of the estimated symbol offsets for user K. In one embodiment, the aggregate results are computed by averaging the estimates of symbol drift and offset associated with each transition region, where each of the estimates is weighted by the number of samples of data used in calculating that estimate. Note when computing the aggregate symbol offset estimates, a static phase offset equal to $i\cdot(2\pi/M)$ is added to the symbol offset estimate associated with each sloping section, where i is the index of the sloping sections, starting at zero for the first sloping section, then one for the next sloping section, and so on. This adjustment is necessary because the jump from $\pi/M$ to $-\pi/M$ between each sloping section of the phase error profile is an artifact of the measurement technique and not due to the actual data. Thus, the effect of this jump is removed before the aggregate results are computed. The following equation mathematically demonstrates how this static phase offset correction is applied to the symbol offset estimate of each sloping section in the phase error profile when calculating the aggregate symbol offset results.

$$\hat{\phi}_k = \frac{\sum_{i=0}^{I-1} L_i \cdot \left( i \cdot \left(\frac{2\pi}{M}\right) + \hat{\phi}_{k,i} \right)}{\sum_{i=0}^{I-1} L_i} \quad (10)$$

Where:
$\hat{\phi}_k$=Estimated phase offset for user "k";
$\hat{\phi}_{k,i}$=Estimated phase offset in the "$i_{th}$" sloping section for user "k";
i=Sloping section index;
I=Total number of sloping sections in the phase error profile for user "k";
$L_i$=Number of samples used to estimate the phase offset in the "$i_{th}$" sloping section; and
M=Total number of possible symbol constellation points.

For example, consider an embodiment where the estimates of symbol drift and offset are calculated with a linear least squares fit to the data of each sloping section, with the first sloping section might include 1000 samples, the second might include 1200 samples, the third might include 900 samples, and so on. The weighting scheme can be normalized to the sloping section having the greatest number of samples. Note that including the transition region data in the calculation increases the number of samples for that sloping section.

The computed aggregate results can then be formed into a matrix (e.g., E(n) or S(n)) for use by the MUD module 120.

Once the phase drift and offset aggregate results for the user are calculated, the method proceeds with compensating 335 for frequency mismatch associated with the user. In one embodiment, this compensation is achieved by multiplying each symbol of the demodulated symbols output by the MUD 120 by a complex phasor in the opposite direction of the estimated symbol drift and offset aggregate results of the user. This effectively corrects the demodulated symbols b(n) that are applied to the bank of decoders 115. For example, $b_{fixed}(n) = b(n) \cdot e^{-j(\Delta\omega n + \Phi)}$ where $\Delta\omega$ equals symbol drift (radians/symbol), $\Phi$ equals symbol offset (radians), and $b_{fixed}(n)$ is the corrected b(n) matrix, also designated as $\underline{b}$ in FIG. 1c.

Figure 3D:
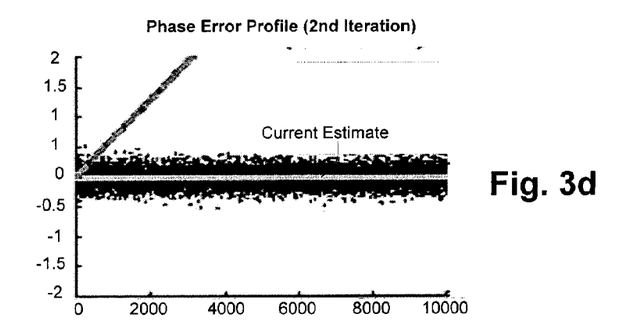
Figure 3E:
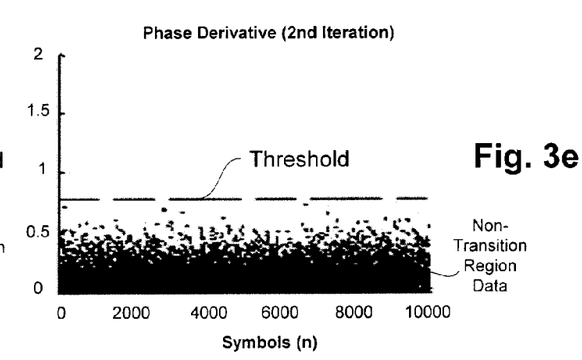

Thus, by performing a series of secondary parameter estimates on the data products being generated within the MUD algorithm (as opposed to operating on the received data), an efficient and robust means for estimating carrier frequency mismatch in any linear multiuser detection system is provided. The right side of FIG. 2a, and FIGS. 3d and 3e illustrate the effect of compensating for symbol constellation rotation due to carrier frequency mismatch.

Phase Error Profile with No Transition Regions

In some cases, there may be no transition sections in the phase error profile (i.e., there is only one continuous sloping section included in the phase error profile). In such applications, there is still carrier frequency drift, but simply not enough to cause symbol estimates to drift over a decision region boundary into a neighboring decision region. Here, the method would include calculating the phase error profile for a user, and calculating estimates of the symbol drift and offset associated with the single sloping section. In one embodiment, the symbol drift and offset estimates associated with the single sloping section are determined by independently calculating a linear least squares fit to the data of the sloping section. No aggregation for multiple transition regions would be necessary here.

Once the estimates of the symbol drift and offset for the user are calculated, the method proceeds with compensating for frequency mismatch associated with the user. In one embodiment, this compensation is achieved by multiplying each symbol of the demodulated symbols output by the MUD 120 by a complex phasor in the opposite direction of the estimates of the symbol drift and offset of the user. This effectively corrects the demodulated symbols b(n) that are applied to the bank of decoders 115 as previously explained. Thus, variations of the method that operate on phase error profiles having no transition regions are also possible.

Frequency Compensation Module

Figure 4A:
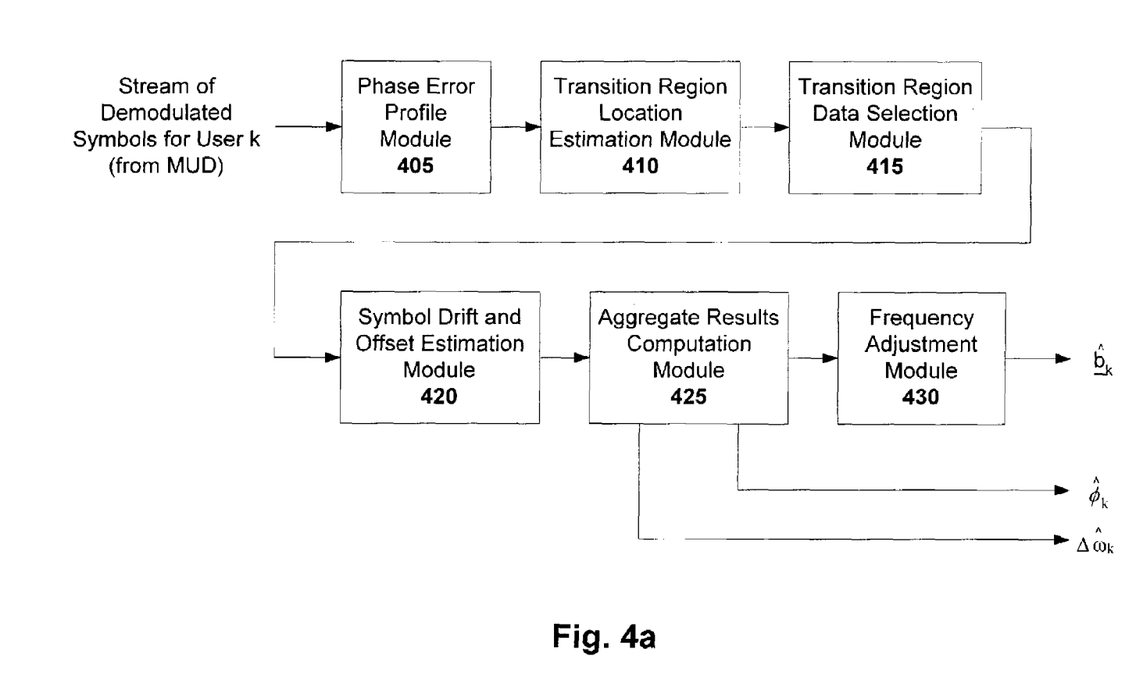
FIG. 4a illustrates a block diagram of a frequency compensation module configured in accordance with an embodiment of the present invention.

FIG. 4a illustrates a block diagram of a frequency compensation module configured in accordance with one embodiment of the present invention. This module can be employed to compensate for frequency mismatch between a receiver and each transmitter of a multiuser communication system having a plurality of users. The frequency compensation module includes a phase error profile module 405, a transition region location estimation module 410, a transition region data selection module 415, a symbol drift and offset estimation module 420, an aggregate results computation module 425, and a frequency adjustment module 430.

The phase error profile module 405 is adapted to calculate a phase error profile for a user k. Here, a MUD module provides an input symbol stream to the frequency compensation module. The transition region location estimation module 410 is adapted to calculate an estimate of the location of each transition region in the phase error profile. The transition region data selector module 415 is adapted to identify transition region data that is above a predetermined threshold, and to eliminate or otherwise ignore the identified transition region data from subsequent processing. Alternatively, the transition region data selector module 415 can be adapted to assign the identified transition region data to its corresponding slope section as previously explained, so that it will be included in the symbol drift and offset estimations. This assignment of the transition data can be based on the threshold that defines a center point between the ends of each sloping section. Thus, the end of the sloping section that the transition region data belongs can be identified, and the data assigned.

The symbol drift and offset estimation module 420 is adapted to calculate estimates of symbol drift and offset associated with the sloping sections included in the phase error profile of user k. Note that the estimates of symbol drift and offset can also be associated with the transition region either just before or just after the sloping section on which the estimates are based. The aggregate results computation module 425 is adapted to compute estimated symbol drift and offset aggregate results based on symbol drift and offset estimates associated with the user k. The frequency adjustment module 430 is adapted to compensate for frequency mismatch based on the estimated symbol drift and offset aggregate results.

As previously explained, a number of samples may be used in each sloping section of the phase error profile. The aggregate results computation module 425 can be further adapted to average the drift and offset estimates associated with each sloping section, where each of the estimates is weighted by the number of samples of data used in calculating that estimate. The frequency adjustment module 430 can be further adapted to multiply each symbol of the user's stream of demodulated symbols by a complex phasor having opposite direction of the estimated symbol drift and offset aggregate results, thereby effectively negating the effects of the carrier frequency mismatch associated with the user k.

Figure 4B:
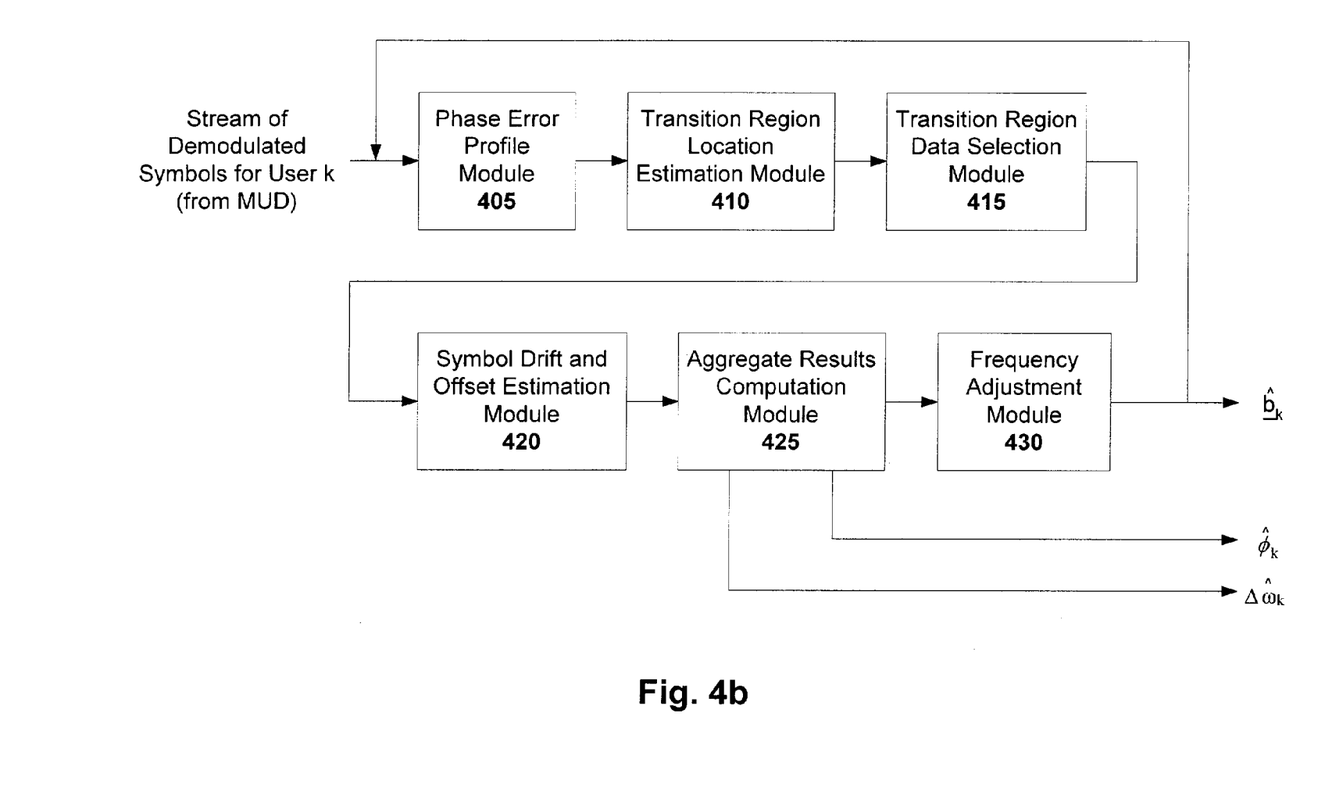
FIG. 4b illustrates a block diagram of a frequency compensation module configured in accordance with another embodiment of the present invention.

FIG. 4b illustrates a block diagram of a frequency compensation module configured in accordance with another embodiment of the present invention. This particular embodiment is similar to that illustrated in FIG. 4a, except that it is further configured with a feedback loop from the output of the frequency adjustment module 430 to the input of the phase error profile module 405. Such a configuration enables an iterative symbol drift and offset estimation module, which can implement any of the previously discussed techniques for estimating the symbol drift and offset. In this particular embodiment, however, the received signal of any one user k can be subjected to multiple symbol drift and offset estimation iterations to further improve the accuracy of those estimations.

The iterative process for each user can be continued, for example, until a specified number of iterations is reached or until the difference between the compensated symbol estimates for the current and previous iterations are below a predefined threshold. Because of the iterative nature of this embodiment, the aggregate results computation module 425 is further adapted to calculate the estimated symbol drift and offset aggregate results for a user k by summing the drift and offset estimates computed in each iteration. For example, $\Delta\hat{\omega}k$ for user k would be equal to $\Delta\hat{\omega}k,1+\Delta\hat{\omega}k,2+\Delta\hat{\omega}k,3 \ldots \Delta\hat{\omega}k,x$. Similarly, $\hat{\phi}k$ for user k would be equal to $\hat{\phi}_{k,1}+\hat{\phi}_{k,2}+\hat{\phi}_{k,3} \ldots \hat{\phi}_{k,x}$. In both examples, x is the number of iterations for that particular user k.

The receiver modules described herein (FIGS. 1a, 1b, 3a–e, and 4a–b) can be implemented in software, hardware, firmware or any combination thereof. For example, the frequency compensation modules 125 may be implemented by a set of instructions executing on one or more digital signal processors or other suitable processing environment. Similarly, various embodiments of the invention may be implemented as instructions encoded on one or more processor readable mediums, that when executed by a processor, carry out principles of the invention as described herein. Alternatively, the frequency compensation modules may be implemented with purpose built silicon, such as an ASIC or FPGA. Note that the functionality of the frequency compensation modules 125 can be integrated into the MUD module 120, so as to effectively form an internal output stage. Numerous other such variations will be apparent in light of this disclosure, and the present invention is not intended to be limited to any one such configuration or embodiment.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method of compensating for frequency mismatch between a receiver and each transmitter of a multiuser communication system having a plurality of users, the method comprising:

calculating a phase error profile for a user, the phase error profile having at least one sloping section and at least one transition region associated with symbol drift and offset;

calculating an estimate of the location of each transition region in the phase error profile;

identifying transition region data that is above a predetermined threshold;

eliminating the identified transition region data above the predetermined threshold from subsequent processing;
calculating estimates of the symbol drifts and offsets associated with each sloping section;
computing estimated symbol drift and offset aggregate results from the estimates of the symbol drifts and offsets; and
compensating for frequency mismatch associated with the user based on the estimated symbol drift and offset aggregate results.

2. The method of claim 1 wherein the method is performed for each of the plurality of users.

3. The method of claim 1 wherein a number of samples are used in computing estimates, and computing the estimated symbol drift and offset aggregate results includes:
averaging the drift and offset estimates associated with each sloping section, where each estimate is weighted by the number of samples of data used in calculating that estimate.

4. The method of claim 1 wherein demodulated symbols associated with a received user signal are output by a linear MUD module of the system, and compensating for frequency mismatch associated with the user includes:
multiplying each symbol of the demodulated symbols by a complex phasor having opposite direction of the estimated symbol drift and offset aggregate results.

5. The method of claim 1 wherein a static phase offset associated with each sloping section is accounted for in symbol offset estimates.

6. The method of claim 1 wherein calculating an estimate of the location of each transition region in the phase error profile includes:
calculating a derivative of the phase error profile; and
calculating an absolute value of the phase error derivative.

7. The method of claim 1 wherein calculating estimates of the symbol drift and offset associated with each sloping region includes:
independently calculating a linear least squares fit to data of each sloping section.

8. A system for compensating for frequency mismatch between a receiver and each transmitter of a multiuser communication system having a plurality of users, the system comprising:
a bank of frequency compensation modules, each frequency compensation module adapted to provide a vector of frequency compensated symbols for a particular user, and to calculate estimated symbol drifts and offsets for that user;
a bank of decoder modules, each decoder module adapted to receive a vector of frequency compensated symbols from a corresponding one of the frequency compensation modules, and to provide error correction; and
a linear multiuser detection module adapted to receive the estimated symbol drifts and offsets for each user from the bank of frequency compensation modules, and frequency compensated bit estimates from the bank of decoder modules.

9. The system of claim 8 wherein each frequency compensation module is further adapted to calculate a phase error profile for a corresponding user, the phase error profile having at least one sloping section and at least one transition region associated with symbol drift and offset.

10. The system of claim 9 wherein each frequency compensation module is further adapted to calculate an estimate of the location of each transition region in the phase error profile.

11. The system of claim 9 wherein each frequency compensation module calculates estimates of symbol drifts and offsets associated with each sloping section by independently calculating a linear least squares fit to data of each sloping section.

12. The system of claim 9 wherein each frequency compensation module is further adapted to identify transition region data that is above a predetermined threshold, and to ignore that transition region data during subsequent processing.

13. The system of claim 9 wherein each frequency compensation module is further adapted to identify transition region data that is above a predetermined threshold, and to calculate the estimated symbol drifts and offsets based on both transition region data having estimates above the predetermined threshold and non-transition region data having estimates below the predetermined threshold.

14. The system of claim 13 wherein each frequency compensation module is further adapted to assign the identified transition region data to a corresponding sloping section, so that it will be included in the symbol drift and offset estimations.

15. The system of claim 8 wherein each frequency compensation module is further adapted to compute estimated symbol drift and offset aggregate results for a user from the corresponding estimated symbol drifts and offsets.

16. The system of claim 15 wherein a number of samples are used in computing estimates, and the estimated symbol drift and offset aggregate results are computed by averaging the drift and offset estimates associated with each sloping section, where each estimate is weighted by the number of samples of data used in calculating that estimate.

17. The system of claim 8 wherein demodulated symbols associated with a received user signal are output by the multiuser detection module, and each frequency compensation module is further adapted to multiply each symbol of the demodulated symbols by a complex phasor having opposite direction of the estimated symbol drift and offset aggregate results.

18. The system of claim 8 wherein the linear multiuser detection module is configured with an MMSE MUD with prior information algorithm.

19. The system of claim 8 wherein each decoder module provides error correction by converting symbols to bits, comparing present bits to at least one of prior bits and subsequent bits, and then converting the bits back to symbols.

20. A system for compensating for frequency mismatch between a receiver and each transmitter of a multiuser communication system having a plurality of users, the system comprising:
a symbol drift and offset estimation module adapted to calculate estimates of symbol drift and offset associated with one or more sloping sections included in a user's phase error profile; and
a frequency adjustment module adapted to compensate for frequency mismatch based on the estimates of symbol drift and offset wherein the frequency adjustment module is adapted to multiply each symbol of a stream of demodulated symbols by a complex phasor having opposite direction of the estimates of symbol drift and offset.

21. The system of claim 20 further comprising:
a phase error profile module adapted to calculate a phase error profile for the user; and
an aggregate results computation module adapted to compute estimated symbol drift and offset aggregate results based on the estimates of symbol drift and offset associated with the user, wherein the frequency adjustment module compensates for frequency mismatch based on the estimated symbol drift and offset aggregate results.

22. The system of claim 21 wherein the frequency adjustment module is adapted to multiply each symbol of a stream of demodulated symbols by a complex phasor having opposite direction of the estimated symbol drift and offset aggregate results.

23. The system of claim 21 wherein a number of samples are used in computing estimates, and the aggregate results computation module is further adapted to average the drift and offset estimates associated with each sloping section, where each estimate is weighted by the number of samples of data used in calculating that estimate.

24. The system of claim 21 wherein the frequency adjustment module has an output that is fed back to an input of the phase error profile module, thereby enabling an iterative symbol drift and offset estimation process for the user.

25. The system of claim 24 wherein the aggregate results computation module is further adapted to calculate the estimated symbol drift and offset aggregate results for the user by summing drift and offset estimates computed each iteration.

26. The system of claim 20 further comprising:
a transition region location estimation module adapted to calculate an estimate of the location of each transition region in the phase error profile; and
a transition region data selector module adapted to identify transition region data that is above a predetermined threshold.

27. The system of claim 26 wherein the transition region data selector module is adapted to eliminate the identified transition region data from subsequent processing.

28. The system of claim 26 wherein the transition region data selector module is adapted to assign the identified transition region data to its corresponding slope section, so that it will be included in symbol drift and offset estimations.

29. A method of compensating for frequency mismatch between a receiver and each transmitter of a multiuser communication system having a plurality of users, the method comprising:
calculating a phase error profile for a user, the phase error profile having one or more sloping sections;
calculating estimates of symbol drifts and offsets associated with each sloping section;
compensating for frequency mismatch associated with the user based on the estimates of symbol drifts and offsets; and
computing estimated symbol drift and offset aggregate results from the estimates of the symbol drifts and offsets, where the compensating for frequency mismatch associated with the user is based on the estimated symbol drift and offset aggregate results.

30. The method of claim 29 wherein the method is performed for each of the plurality of users.

31. The method of claim 29 wherein demodulated symbols associated with a received user signal are output by a linear MUD module of the system, and compensating for frequency mismatch associated with the user includes:
multiplying each symbol of the demodulated symbols by a complex phasor having opposite direction of the estimates of symbol drifts and offsets.

32. The method of claim 29 wherein a number of samples are used in computing estimates, and computing the estimated symbol drift and offset aggregate results includes:
averaging the drift and offset estimates associated with each sloping section, where each estimate is weighted by the number of samples of data used in calculating that estimate.

33. The method of claim 29 wherein calculating estimates of the symbol drift and offset associated with each sloping section includes:
independently calculating a linear least squares fit to data of each sloping section.

* * * * *